D. C. WILSON.
TRAIN LIGHTING GENERATOR DRIVE.
APPLICATION FILED SEPT. 13, 1920.

1,428,309.

Patented Sept. 5, 1922.

Witness
Chas. L. Griestamer.

Inventor
Don C. Wilson,
By Watson, Cox, Morse & Grindle,
Attorneys

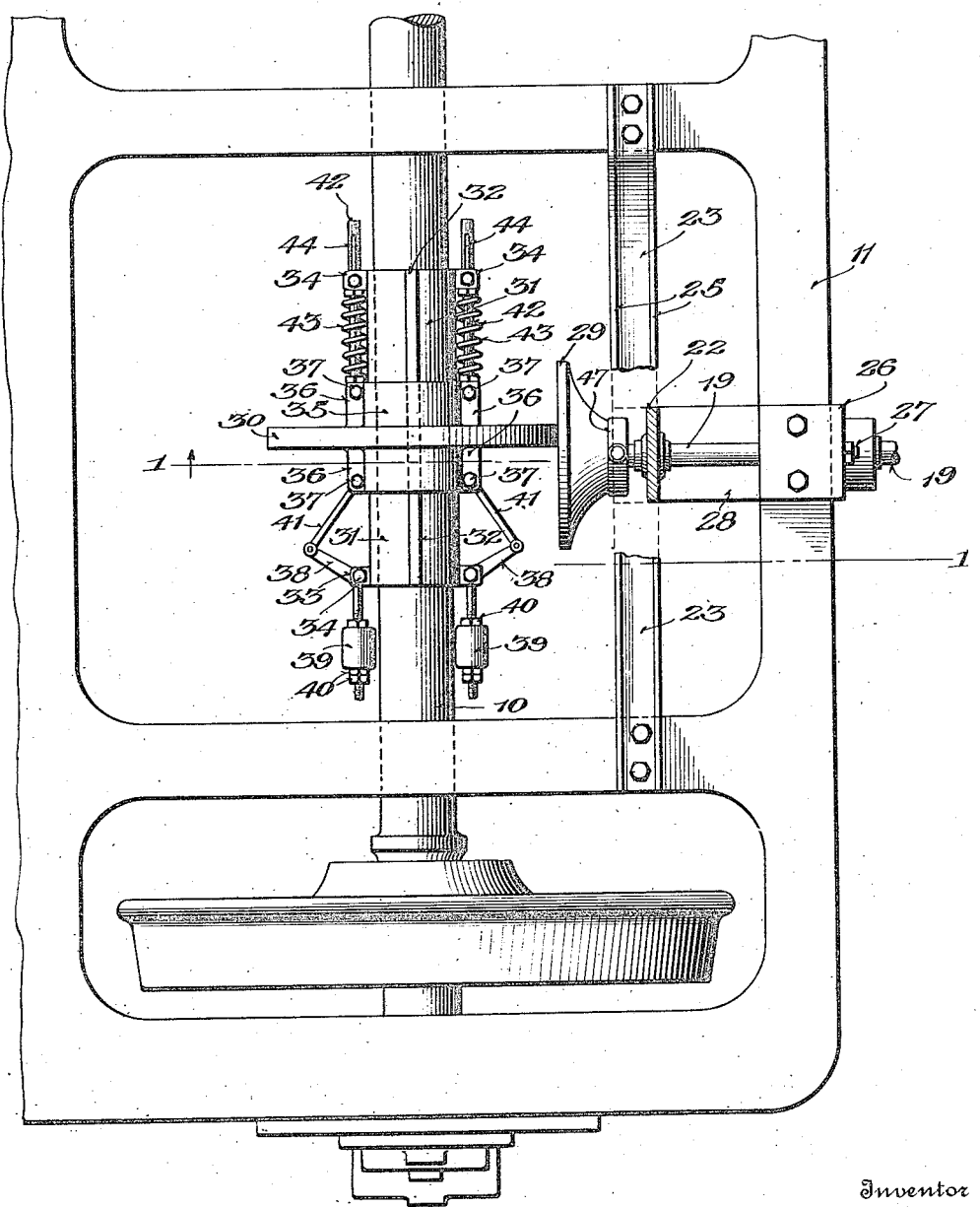

Patented Sept. 5, 1922.

1,428,309

UNITED STATES PATENT OFFICE.

DON C. WILSON, OF NEW YORK, N. Y.

TRAIN-LIGHTING-GENERATOR DRIVE.

Application filed September 13, 1920. Serial No. 410,081.

*To all whom it may concern:*

Be it known that I, DON C. WILSON, a citizen of the United States, and residing in New York city, county of New York, State of New York, have invented certain new and useful Improvements in Train-Lighting-Generator Drives, of which the following is a specification.

The present invention relates to mechanism for driving a generator mounted on a car from an axle of the truck at a substantially constant speed.

In railway service heretofore belts have been employed almost exclusively for this purpose. Because of the unusual conditions, such as sand, ice, snow and rain, to which the belts are subjected, they do not last for any considerable time. Consequently the cost of maintaining these drives is relatively great. It has been proposed to use different forms of chains in these drives, but in actual operation it is found that such connections are not satisfactory.

It is the main object of the present invention to provide a drive which will be more dependable than any heretofore employed and which can be attached to trucks now in use with a minimum of labor.

Other objects and features of novelty will be apparent from the description taken in connection with the drawings in which—

Figure 2 is a plan view of some of the parts shown in Figure 1, and

Figure 1:
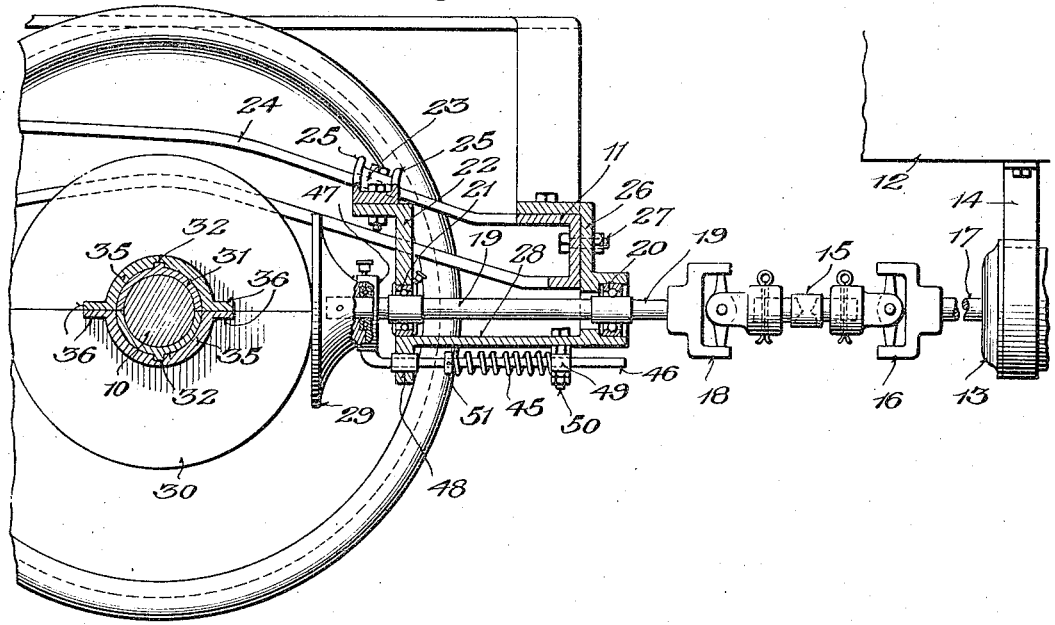
Figure 1 is a vertical sectional elevation taken through an axle of a truck and part of the frame and illustrating the present invention as embodied therewith.
Figure 3:
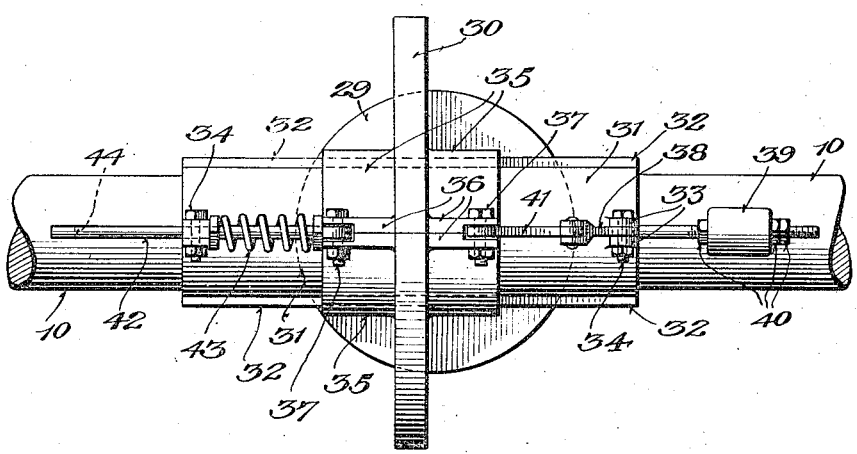
Figure 3 is an elevation of the device as seen from the left of Figure 2.

Referring to the drawings numeral 10 indicates an axle of a railway truck, part of the frame of which is indicated at 11. Part of the body of the car is indicated by the numeral 12 and a generator 13 is secured to the body as by the brackets 14, the axis of the generator being disposed substantially at right angles to the axis of the axle.

The drive of the present invention which connects the axle and generator includes a short shaft 15, one end of which is connected by means of the universal joint 16 to the armature shaft 17 of the generator. The other end of the shaft is connected by a second universal joint 18 to a shaft 19 carried in bearings 20 and 21 by the truck frame. The bearing 21 is mounted in a bracket 22 suspended from a bar 23 secured to the frame members 24 of the truck as by means of studs 25. The bearing 20 is carried in a bracket 26 secured to the frame 11 by the bolt 27. Preferably these two brackets are joined together and held in proper spaced relation by the member 28. The shaft 19 on the end adjacent the axle has a disc 29 adapted to be pressed against the periphery of a disc 30 carried by the axle. In order that the disc may be mounted on the axle with a minimum of labor a split construction is employed. Thus a split sleeve 31 is secured to the axle and has a pair of keys or splines 32 extending throughout the length thereof. The halves of the split sleeve at their ends are provided with the ears 33 through which extend clamping bolts 34. The disc 30 is provided with a hub 35 which is formed with ears 36 on opposite sides thereof clamped together by the bolts 37. At one end of the sleeve the ears 33 are recessed so that the bolts 34 may carry the bent levers 38. The ends of these levers adjacent the axle have weights 39 disposed thereon adapted to be locked in adjusted position by nuts 40. The other ends of these levers are connected to the bolts 37 at one side of the disc 30 by links 41. It will be observed that as the rotative speed of the axle increases, the weights 39 will move outwardly, thereby forcing the disc 30 upwardly as viewed in Figure 2. This motion is resisted by springs 42 disposed around rods 43, at one end connected to the bolts 37 and at the other end provided with slots 44 for the bolts 34 on the associated end of the sleeve.

The discs are forced together by a spring 45 disposed around a rod 46 carried parallel to the shaft 19. One end of this rod is formed as a collar 47 which engages the hub of the disc 29. This rod is slidable in the bearings 48 and 49 carried by the member 28. The bearing 49 is secured to the member by bolt 50 and one end of the spring acts against this bearing. The other end acts against a collar 51 carried by the rod. In case a spring should break it is obvious that the same may be replaced very quickly merely by removing the bearing 49.

In operation rotation of the axle is communicated by means of disc 30 to disc 29 and thence to the armature shaft of the generator. The speed responsive means associated with the disc 30 causes it to move across the face of disc 29 so that regardless of the speed of the axle, the armature shaft will be driven at substantially constant angular velocity.

Although a specific embodiment of the invention has been described in detail it is to be understood that the invention is not thus limited but includes modifications and changes which come within the scope of the appended claims.

Having thus described my invention what I claim as new and desire to secure by Letters Patent is:

1. Mechanism for driving a generator at constant speed from the axle of a truck including in combination, a split sleeve secured to the axle, a split disc slidable on said sleeve and rotatable therewith, a shaft disposed at right angles to the axis of the axle, two spaced bearings on the truck for said shaft, a disc on one end of the shaft having its face contacting the periphery of said split disc, a spring forcing said discs together, a shaft having universal joint connection at one end to the end of said first mentioned shaft and at its other end to the armature shaft of said generator, and speed responsive means for shifting the first mentioned disc across the face of the second to drive said shaft at a substantially constant speed.

2. Mechanism for driving a generator at constant speed from the axle of a truck including in combination, a generator carried by the car body with its armature shaft axis in a line passing transversely through the axle, a shaft carried by the truck between said axle and generator substantially in line with said armature shaft, a short shaft connecting the adjacent ends of said shafts and aligned therewith, a universal joint being included in the connection, a friction disk so secured to and across the other end of the shaft which is carried by the truck as to rotate therewith, a speed governor controlled disk slidable on the axle cooperating with said first disk and yielding means for forcing said first mentioned disk longitudinally of its shaft against the margin of said second mentioned disk.

3. A device of the class described for use on a railway car including in combination, a rotary shaft carried by the car body through fixed bearings, the axis of said shaft being in a line passing transversely through the axle of the car truck, a shaft carried by the truck in fixed bearings and substantially aligned with but spaced longitudinally from said first shaft, a short aligned shaft having universal joint connections at its ends to the ends of said first mentioned shafts, a friction driven disk on the other end of said shaft which is carried by the truck, a driving disk so secured on the axle as to rotate therewith and in a plane passing at right angles through the facing surface of the other disk between its margin and center, speed governor controlled means for moving said disk longitudinally of the axis between fixed limits, and yielding means for forcing said first mentioned disk along its shaft towards said second disk whereby its facing side surface will be in frictional engagement with the periphery of said second mentioned disk.

4. Constant speed driving means comprising in combination, a body or frame, a drive shaft rotatively connected to said frame and adapted to be driven at varying speeds, a disks having a central hub surrounding said shaft and so connected thereto as to permit longitudinal sliding movement thereon but to cause simultaneous rotary movement, a drive shaft rotatively connected to said frame carrying a disk on its end at right angles to said first disk and with its surface between its margin and center in frictional engagement with the periphery of said first disk; yielding means for forcing said second disk into engagement with the first disk and speed governor controlled means for so moving said first disk longitudinally of the drive shaft as to cause the driven shaft to rotate at substantially constant speed.

5. Means for driving at constant speed from the axle of a truck comprising in combination, a rotary shaft to be driven mounted in spaced bearings below and carried by the truck frame, the said shaft entering the longitudinal space occupied by said frame at one end at right angles to and in substantially the same horizontal plane as the axle terminating at its inner end a predetermined distance from the axle and having its outer end so formed as to be adapted for universal joint connection to some corresponding part, a disk on the inner end of said shaft facing the axle, a disk so mounted on and connected to said axle as to rotate therewith and slide longitudinally thereon, and in such position that its periphery will make contact with the facing surface of said first disk, speed governor controlled means carried by said axle for so moving said second disk longitudinally thereof as to cause constant rotary speed of said driven shaft through its disk, and yielding means for forcing said first disk against said second disk.

6. Constant speed driving mechanism adapted to be operated by the axle of a railway car truck comprising in combination, a rotary shaft to be driven, a disk having a flat frictional engaging surface on one side and a central hub on the other side, the said hub so fitting and engaging one end of said shaft as to rotate therewith while permitting longitudinal movement thereon, supporting means for said shaft including spaced rotary bearings between said disk and the other end of the shaft, means for detachably securing said supporting means to the truck frame with said shaft extending towards the axle of the truck at substantially right angles thereto, a rod parallel to said shaft slidably carried by said supporting means and operatively connected at one end to said disk, a spring engaging said supporting means and rod tending to move it towards said disk, a speed governor controlled disk slidable on the axle in such position that its peripheral surface will frictionally engage the outer flat surface of said first mentioned disk.

7. Constant speed driving mechanism adapted to be operated by the axle of a railway car truck comprising in combination, a rotary shaft to be driven, a disk having a flat frictional engaging surface on one side and a central hub on the other side, the said hub so fitting and engaging one end of said shaft as to rotate therewith while permitting longitudinal movement thereon, supporting means for said shaft including integrally connected but longitudinally spaced brackets having aligned bearing openings near one end surrounding said shaft between the disk and the other end thereof, means for securing the other ends of said brackets to the truck frame in such position that said shaft will extend towards the axle at substantially right angles, a collar surrounding said shaft engaging the hub of said disk, spring pressed means carried by said supporting means tending to move said collar and disk along the shaft towards its end, and a speed governor controlled disk slidable on the axle in such position that its peripheral surface will be in contact with and frictionally engage the outer flat surface of said first mentioned disk.

8. Constant speed driving means comprising in combination, a body or frame, a drive shaft rotatively connected to said frame and adapted to be driven at varying speed, a sleeve including two separable parts adapted to fit together around said shaft longitudinally, means rigidly securing said sleeve to said shaft, a tubular hub including two parts separable on longitudinal lines fitting around the outer surface of said sleeve and so secured thereto as to permit free longitudinal sliding movement thereon but to prevent relative rotary movement, a rigid disk carried by and projecting laterally from said hub and having a peripheral surface adapted for frictional engagement, a driven shaft rotatively carried by said body at substantially right angles to said drive shaft with its axis in substantially the same plane as the axis of said drive shaft, a disk carried by said shaft at its end having its outer flat surface between the margin and center in contact and frictional engagement with the margin of said first disk, yielding means forcing said second disk in the direction of the axis of its shaft against said first disk, and automatic means carried by said sleeve and controlled by the speed of the drive shaft for so moving said first disk longitudinally of the sleeve as to cause substantially constant rotary speed of said driven shaft.

9. Mechanism for driving at constant speed from the axle of a railway truck including in combination a sleeve composed of two parts separable on longitudinal lines and adapted to be placed laterally on the axle between its ends and including means for clamping the parts together around and to the axle in rigid engagement therewith, a two part disk with integral hub sections on said sleeve between its ends, its parts being laterally removable from the sleeve and the contact surfaces of said hub and sleeve being so formed and structurally related as to prevent relative rotation while permitting the hub and disk to slide longitudinally of the sleeve and speed governor controlled means connecting said hub to the ends of said sleeve so adjusted as to cause such predetermined rate of longitudinal movement of the disk compared to the rate of rotation of the axle as would cause the periphery of the disk when operatively engaging the face of a disk mounted at right angles and in predetermined relative position to rotate said second disk at constant speed.

10. Mechanism for driving at regulated speed from the axle of a railway truck including in combination, a sleeve composed of two semi-cylindrical sections fitting the axle each having lateral ears at the ends of its longitudinal edges, bolts passing through the overlapped ears securing the sections together and rigidly on the axle, a two part disk having semi-cylindrical hub portions fitting on said sleeve provided with longitudinal flanges at their edges, bolts passing through the lapping flanges securing the hub and disk portions together, the meeting surfaces of the hub and sleeve having tongue and groove connection to permit longitudinal sliding of the disk on the sleeve, springs interposed between the ears at one end of the sleeve and the ends of flanges of said hub and bent levers pivoted at the bends to the bolts connecting the ears of the sleeve opposite to those engaged by the springs, an adjustable weight on one end of each bent lever the other end being pivotally connected to a link which in turn is pivotally connected at its other end to the bolts through the side flanges of the hub.

11. Mechanism for driving a generator from the axle of a truck including in combination, a generator carried by the car body with its armature shaft axis in a line passing transversely through the axle, a shaft carried by the truck between said axle and generator substantially in line with said armature shaft, a short shaft connecting the adjacent ends of said shafts and aligned therewith, a universal joint being included in the connection; a friction disk so secured to and across the other end of the shaft which is carried by the truck as to rotate therewith, a disk on and rotatively connected to said axle cooperating with said first disk and yielding means for forcing said first mentioned disk longitudinally of its shaft against the margin of said second mentioned disk.

12. A device of the class described for use on a railway car including in combination, a rotary shaft carried by the car body through fixed bearings, the axis of said shaft being in a line passing transversely through the axle of the car truck a shaft carried by the truck in fixed bearings and substantially aligned with but spaced longitudinally from said first shaft, a short aligned shaft having universal joint connections at its ends to the ends of said first mentioned shaft, a friction driven disk on the other end of said shaft which is carried by the truck, a driving disk so secured on the axle as to rotate therewith and in a plane passing at right angles through the facing surface of the other disk between its margin and center, and yielding means for forcing said first mentioned disk along its shaft towards said second disk whereby its facing side surface will be in frictional engagement with the periphery of said second mentioned disk.

In testimony whereof I affix my signature.

DON C. WILSON.